United States Patent [19]

Basch

[11] Patent Number: 5,163,488
[45] Date of Patent: Nov. 17, 1992

[54] APPARATUS FOR THE PRESENTATION IN SUPERPOSED LAYERS OF LIQUIDS OF DIFFERENT DENSITIES, PARTICULARLY LIQUID FOODSTUFFS

[76] Inventor: Armand Basch, 19 rue de la Gare, 67240 Oberhoffen S/Moder, France

[21] Appl. No.: 548,937

[22] PCT Filed: Nov. 29, 1989

[86] PCT No.: PCT/FR89/00617
§ 371 Date: Sep. 17, 1990
§ 102(e) Date: Sep. 17, 1990

[87] PCT Pub. No.: WO90/06074
PCT Pub. Date: Jun. 14, 1990

[30] Foreign Application Priority Data

Nov. 29, 1988 [FR] France .................. 88 15797

[51] Int. Cl.⁵ .............................. B67D 5/56
[52] U.S. Cl. .................... 141/100; 141/104; 141/106; 141/247; 141/286; 141/344; 222/129.4
[58] Field of Search ............ 222/51, 67, 129.4, 129.3, 222/132, 135, 136; 141/94, 95, 100, 102, 104, 107, 236, 247, 248, 286, 288, 297, 299, 300, 325, 326, 331, 337, 344; 138/145, 146

[56] References Cited

U.S. PATENT DOCUMENTS

| | | | |
|---|---|---|---|
| 487,866 | 12/1892 | Kiefer | 141/288 X |
| 1,617,748 | 2/1927 | Dunn | 222/136 |
| 1,664,266 | 3/1928 | Del Rio | 222/67 X |
| 2,420,959 | 5/1947 | Lanese | 222/132 |
| 2,715,488 | 8/1955 | Conlon | 141/95 |
| 2,740,571 | 4/1956 | Busto | 141/94 |
| 3,001,770 | 9/1961 | Mueller | 222/135 X |
| 3,185,189 | 5/1965 | Reid | 141/100 |
| 3,567,075 | 3/1971 | Neri | 222/129.4 |
| 3,579,652 | 5/1971 | Ericson | 141/337 X |
| 4,199,649 | 4/1980 | Yundt | 428/411 |
| 4,226,266 | 10/1980 | Guigan | 141/11 |

FOREIGN PATENT DOCUMENTS 899988 10/1984 Belgium .

Primary Examiner—Henry J. Recla
Assistant Examiner—Casey Jacyna
Attorney, Agent, or Firm—Young & Thompson

[57] ABSTRACT

The present invention relates to a device for the presentation in superposed layers of liquids of different densities, particularly liquid foodstuffs, essentially constituted by a body (1) adapted to be mounted on a glass (2), to be filled, and having a receptacle (3) for reception of the liquids, on the side opposite that bearing on the glass (2), characterized in that it is provided with a spherical float (4) coming into contact with the liquid in the glass (2) and connected to a rod (5) guided in a discharge channel (6) of the receptacle (3) for reception of the liquids in the direction of the glass (2), arranged in the body (1) and opening into said receptacle (3), this rod (5) being provided at its end opposite the float (4) with a stop forming simultaneously a manipulable handle (7).

8 Claims, 2 Drawing Sheets

1

APPARATUS FOR THE PRESENTATION IN SUPERPOSED LAYERS OF LIQUIDS OF DIFFERENT DENSITIES, PARTICULARLY LIQUID FOODSTUFFS

FIELD OF THE INVENTION

The present invention relates to the field of preparation of liquids, particularly liquid foodstuffs, especially those served as aperitifs or desserts, and has for its object an apparatus for the presentation of superposed layers of liquids of this type of different densities.

BACKGROUND OF THE INVENTION

At present, the preparation of liquid foodstuffs, used as aperitifs or desserts and constituted by several components of different densities, is effected by directly pouring the various components into a glass provided for this purpose. Generally, the components then mix more or less intimately before being served. This mixture, which should be effected before consumption, has, however, the drawback of rather random presentation of the product served, particularly in the case of a mixture of an alcoholic beverage and another beverage, hot or cold, of a very different color.

To obtain an original and attractive presentation of different liquids, according to their color and density, in the same glass, there are especially qualified people in the food field, whose manual skill permits superposing layers of liquids of different color and density thereby to obtain a distinctive presentation of the product served.

However, the use of such personnel is confined to a very small number of establishments because they have to be paid more. Moreover, such a presentation of a liquid of several components is always subject to accidents of handling involving a greater or lesser mixture of the different components and detracting from the desired presentation.

To overcome this drawback, there has been proposed in Belgian Pat. No. 899,988 a device adapted to effect a superposition of liquids of different densities, this device being constituted by a body adapted to be positioned on a glass and provided with a receptacle for receiving a liquid, whose outlet is regulated by means of a sliding valve, said liquid flowing through a floating member in the form of a disc or hemisphere to form successive superposed layers.

However, the device according to this document has difficulties in guiding the floating member because there is a great risk of blocking this latter in the body, particularly following clogging due to the sugar contained in the different liquids used, said sugar accumulating at the level of the guide which is difficult to access for washing.

Moreover, the floating member used has projecting portions which effect mixing of the layers by creation of eddies upon retraction. Still further, this floating member does not permit obtaining laminar flow, this latter being unobtainable moreover along the length of the guide rod, because of variable outflow of the regulated liquid through the sliding vane.

Furthermore, even the concept of a control valve is fraught with further difficulty due to the normal wear of its constituent members, which also has an unfavorable influence on the flow of the liquids, a supplemental difficulty being due to even the mounting of the guide rod of the floating member which can be jarred at any time during regulation of the valve and thus cause eddies which detract from a desirable presentation.

SUMMARY OF THE INVENTION

The present invention has for its object to overcome these drawbacks.

It thus has for its object a device for the presentation in superposed layers of liquids of different densities, particularly of liquid foodstuffs, which is essentially constituted by a body adapted to be mounted on a glass to be filled, and having a receptacle to receive liquids, from the side opposite that on which it bears on the glass, characterized in that it is provided with a spherical float coming into contact with the liquid in the glass and connected to a guide rod through a discharge channel of the receptacle that receives the liquids in the direction of the glass, arranged in the body and opening in said receptacle, this rod being provided at its end opposite the float with a stop forming simultaneously a handle for manipulation.

BRIEF DESCRIPTION OF THE DRAWINGS

The invention will be better understood, thanks to the following description, which relates to preferred embodiments, given by way of non-limiting examples, and explained with reference to the accompanying schematic drawings, in which.

DESCRIPTION OF THE PREFERRED EMBODIMENTS

Figure 1:
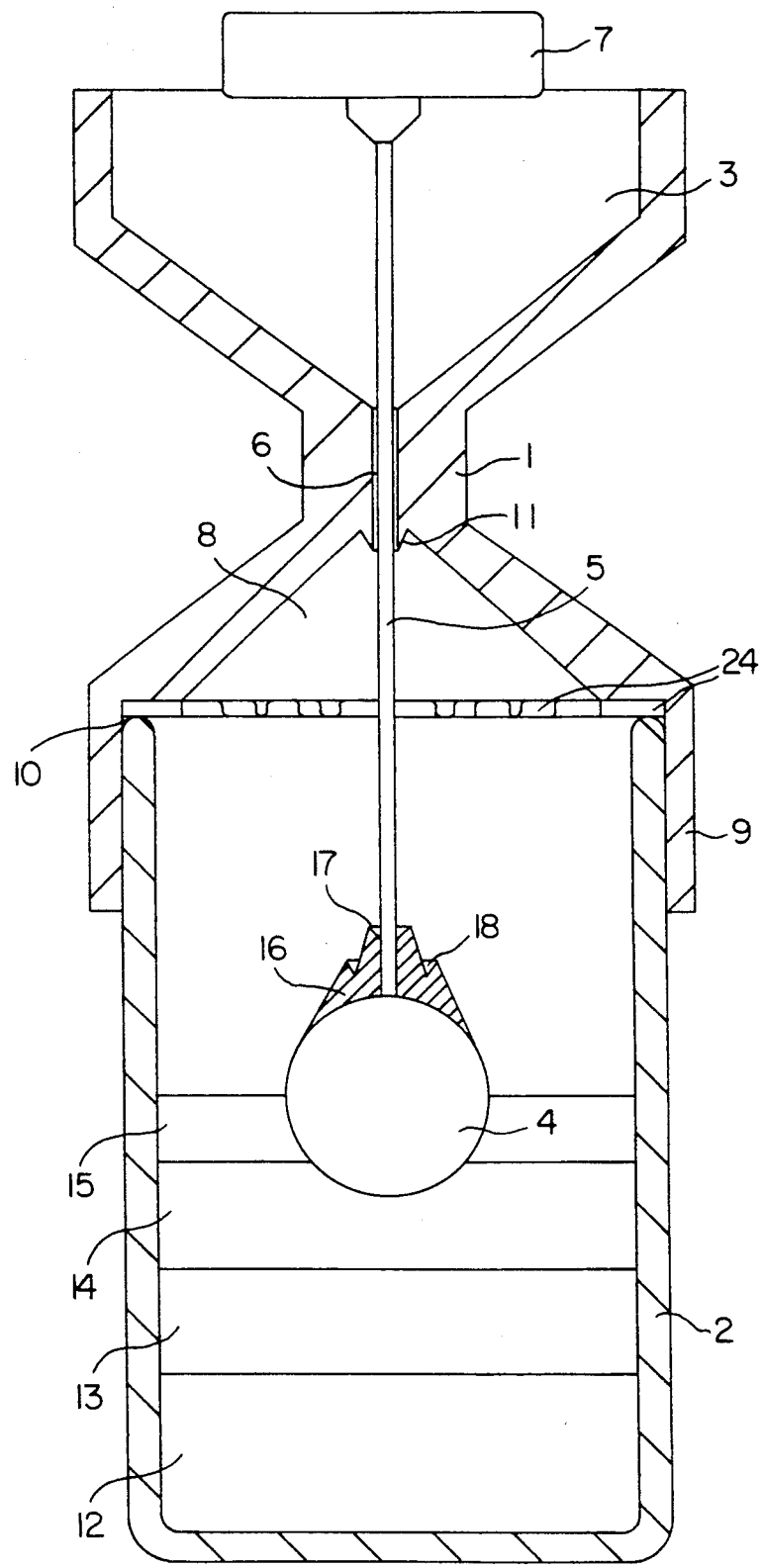
FIG. 1 is a cross-sectional view of the device according to the invention.

The device for the presentation in superposed layers of liquids of different densities, particularly liquid foodstuffs, according to the invention, shown by way of example in FIG. 1 of the accompanying drawings, is essentially constituted by a body 1 adapted to be mounted on a glass 2 to be filled, and having a receptacle 3 for reception of the liquids, on the side opposite that bearing on the glass 2, is characterized in that it is provided with a spherical float 4 coming into contact with the liquid in the glass 2 and connected to a rod 5 guided in a discharge channel 6 of the receptacle 3 for reception of the liquids in the direction of the glass 2, arranged in the body 1 and opening into said receptacle 3, this rod 5 being provided at its end opposite the float 4 with a stop forming simultaneously a handle 7 for manipulation.

On the side bearing on glass 2, the body 1 has a recess 8 permitting reception of the float 4 in the completely filled position of glass 2 or when the device rests on any support in a non-use position. This recess 8 as well as the receptacle 3 may have any shape and cross section, the recess 8 being simply to permit complete disappearance of the float 4 into the volume bounded by the lower surface of body 1.

Body 1 also has a peripheral flange 9 surrounding a face 10 bearing on said glass 2 for maintaining it thereon, which bearing face 10 can be flat or simply constitute an extension of recess 8.

According to another characteristic of the invention, the recess 8 is provided at the level of its connection to the discharge channel 6 of receptacle 3, with a circular guide appendage 11 whose slope is opposite that of recess 8, preferably with a conicity in the direction of rod 5 of float 4. This appendage 11 is adapted to promote the flow of liquid from receptacle 3 along the rod 5 in the direction of float 4 and to avoid any parasitic flow along the wall of recess 8.

Moreover, the connection between the float 4 and the rod 5 is effected by means of a junction portion 16 formed by two superposed truncated cones, of which the smaller defines on the one hand about the rod 5 an inverted conical recess 17 and on the other hand, with the larger, a second receptacle in the form of an annular throat 18, the upper end of this portion 16 coacting shape-matingly with the circular guide appendage 11 in the extreme upper position of float 4. Thus, when the glass 2 is filled or when the device is raised by pulling on the handle 7, the flow of liquid is instantaneously interrupted and accidental overflowing or spilling is impossible.

These receptacles 17 and 18 are adapted to promote a uniform distribution over all the surface of the portion 16, to the junction with the float 4, of the liquid to be poured in layers into the glass 2.

So as further to improve the laminar flow of the liquid, the float 4 is preferably provided with a specific surface treatment which confers superficial microporosity and a roughness, by rolling in a mixture of silica and ammoniacal detergent. Such a surface treatment permits ensuring completely laminar flow of the liquid over all the surface of the float 4 and thus a perfect distribution of the liquid by layers, without eddies.

According to another characteristic of the invention, the discharge channel has a ratio of passage diameter to the diameter of the rod 5 equal to 1.7 with respective preferred diameters of 3.4 mm and 2 mm and the float 4 preferably has a diameter of 42 mm. These dimensions permit obtaining optimum flow of all the liquids commonly used for superposition without mixing.

If the ratio between the diameters of the discharge channel 6 and the rod 5 were greater, the flow of liquid would be too great and would risk giving rise to eddies in the glass 2, while a smaller ratio would not permit the flow of all the liquids.

According to a modified embodiment of the invention, not shown in the accompanying drawings, the peripheral flange for retention on the glass 2, which is provided on the lower portion of the body 1 at the level of its bearing surface 10 on the glass 2, may also be in the form of a resilient or adjustable member permitting an adaptation to very different diameters of glasses while ensuring maintenance of the body 1 on these glasses.

Figure 2:
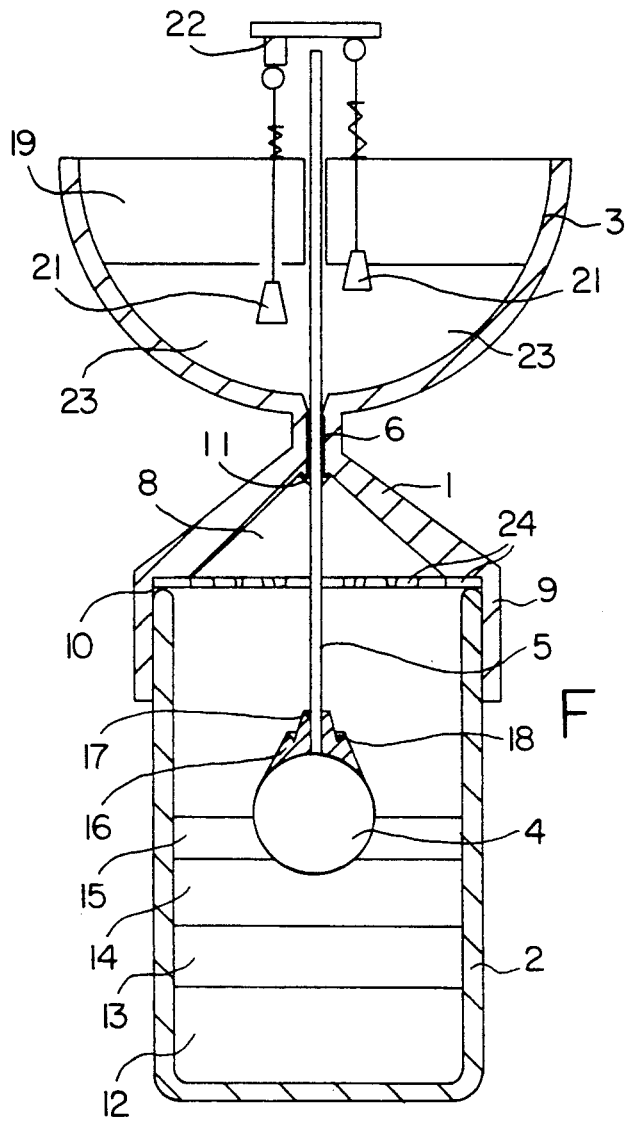
FIG. 2 is a view similar to FIG. 1 of a modified embodiment according to the invention.
Figure 3:
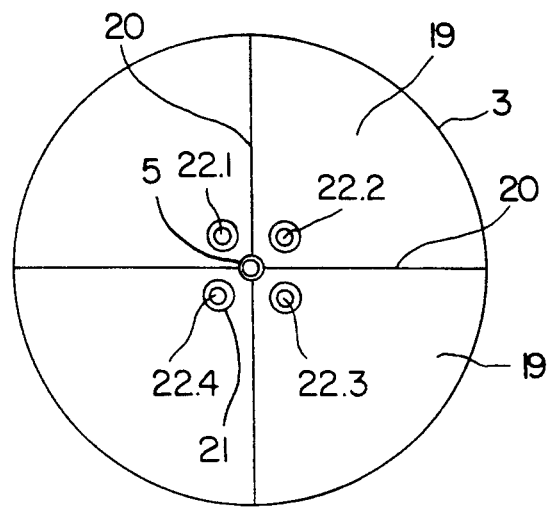
FIG. 3 is a partial plan view of the device according to FIG. 2.

FIGS. 2 and 3 of the accompanying drawings show a modified embodiment of the invention, in which the receptacle 3 is divided into several compartments 19 by means of vertical walls 20 extending radially about channel 6 for guiding rod 5 of float 4, these compartments 19 being connected by means of conical spring valves 21 or the like, each manipulable by means of a button 22, to a discharge chamber 23 communicating with a guide channel 6. Thus, it is possible to fill the compartments 19 of the receptacle 4 with several superposed liquids and to effect the flow of these into the glass 2 by successive and predetermined actuation of the buttons 22.

The buttons 22 can preferably be numbered (22.1, 22.2, 22.3 and 22.4) so as to permit the user to index the compartments as a function of the densities of the liquids.

According to another characteristic of the invention, not shown in the accompanying drawings, the guide channel 6 can preferably be elongated above the compartments 19 and the manipulable buttons 22 of the conical spring valves 21 can be provided with a cam disc for successively actuating the buttons 22, provided with a position index. Such a disc permits, by simple rotation, bringing its cam successively to each button 22, as a function of a predetermined direction of rotation, so as to maintain its corresponding valve 21 in open position, the position index permitting controlling instantaneously the valve 21 in service. Thus, it is possible to use simultaneously several devices according to the invention, without being obliged to monitor them individually or to control their operation. Such an embodiment thus permits substantially increasing the speed of production of a given beverage.

It is also possible, according to another modified form of the invention, not shown in the accompanying drawings, to actuate the valves 21 electrically by means of small electromagnets energized by means of detectors of the liquid level in the compartments 19, the electrical circuits for control and detection being connected to a programmable processor. Such an embodiment permits obtaining a device of high flow rate.

Finally, the invention also has for its object a device, not shown, whose receptacle 3 is preferably connected to an automatic feed of liquids, constituted by conduits connected by means of specific pumps to various liquid reservoirs, said pumps being individually actuated by means of a programmable processor as a function of the type of preparation to be produced. In such a case, it is entirely possible to memorize a certain number of predetermined preparations, with their sequence for introducing the liquids as a function of the density of these latter and to distribute said liquids by simple designation of the selected preparation.

Finally, according to another characteristic of the invention, the bearing face 10 on the glass 2 of the body 1 is provided preferably with radial ribs 24 for bearing on said glass 2. Such ribs 24 permit especially facilitating the passage of escaping air during filling of the glass 2.

The various constituent parts of the device according to the invention can be produced of any materials permitting use for food purposes, namely, by molding, shaping, or machining.

The device according to the invention is utilized in the following manner:

The liquid 12 of greatest density is poured directly into the glass 2 and the body 1 is positioned on said glass 2. The float 4 of the device is moistened so as to permit flow of liquid over all its surface, by direct immersion in the first liquid 12 or by preliminary passage, before positioning body 1, under water from a faucet. The second liquid 13, of less density than the first, is then poured into the receptacle 3 of the body 1 and flows through the discharge channel 6 along the rod 5 and along the float 4. Because of its laminar flow along float 4, the second liquid 13 spreads out on top of the liquid 12 without mixing with this latter. Then, the liquid 14, of density less than that of liquid 13, is placed in the same manner and the liquid 15, of even less density, is also emplaced. This latter operation is shown more particularly in FIG. 1 of the accompanying drawings.

Positioning in the same glass, of liquids of different densities and preferably of different colors, without mixing these liquids with each other, thus in layers perfectly distinct, is rendered possible by the fact that each liquid, during its positioning, is "laid" on the preceding liquid in a very gentle manner, that is without any eddying which would effect mixing of the liquids in contact.

Thanks to the invention, it is possible to provide a device permitting a superposition of several liquids of different densities and colors, the densities decreasing upwardly, in a glass, and usable by operators who have not been given special training.

The invention is more particularly applicable to the field of food supply, particularly for the preparation of aperitifs or desserts composed of several liquids, permitting an original and an attractive presentation to the consumer.

Of course, the invention is not limited to the embodiments described and shown in the accompanying drawings. Modifications remain possible, particularly as to the construction of the various elements or by substitution of technical equivalents, without thus departing from the scope of protection of the invention.

I claim:

1. In a device for the presentation in superposed layers of liquids of different density, particularly liquid foodstuffs, having a body (1) adapted to be mounted on a glass (2) to be filled, and having a receptacle (3) for reception of the liquids, on the side opposite that bearing on the glass (2), the improvement wherein the body is provided with a spherical float (4) that contacts the liquid in the glass (2) and is connected to a rod (5) guided in a discharge channel (6) of the receptacle (3) for reception of the liquids in the direction of the glass (2), said discharge channel (6) being arranged in the body (1) and opening into said receptacle (3), said rod (5) being provided at its end opposite the float (4) with a stop forming simultaneously a manipulable handle (7), said body (1) having on the side bearing on the glass (2), a recess (8) permitting the reception of the float (4) in the position in which the glass (2) is totally filled or when the device rests on any support in non-use position, said recess (8) being provided, at the level of its junction with the discharge channel (6) of the receptacle (3), with a circular guide appendage (11) whose slope is opposite that of the recess (8), and with a conicity in the direction of the rod (5) of the float (4), said body (1) further comprising a junction portion (16) interconnecting said rod (5) and said float (4), said junction portion (16) having flow-directing surfaces (17, 18) transmitting laminar flow of said liquids from said rod (5) to said float (4).

2. Device according to claim 1, wherein the junction portion (16) is formed by two superposed truncated cones, of which the smaller defines on the one hand about the rod (5) a conical inverted receptacle (17) and, on the other hand, with the larger a second receptacle in the form of an annular throat (18), the upper end of said junction portion (16) coacting shape-matingly with the circular guide appendage (11) in the extreme uppermost position of the float (4).

3. Device according to claim 1, wherein the body (1) also has a peripheral flange (9) encompassing a surface (10) bearing on said glass (2) for maintaining it on the glass (2), said surface (10) constituting an extension of the recess (8).

4. Device according to claim 3, wherein the surface (10) bearing on the glass (2) of the body (1) is provided with radial ribs (24) bearing on said glass (2).

5. In a device for the presentation in superposed layers of liquids of different density, particularly liquid foodstuffs, having a body (1) adapted to be mounted on a glass (2) to be filled, and having a receptacle (3) for reception of the liquids, on the side opposite that bearing on the glass (2), the improvement wherein the body is provided with a spherical float (4) that contacts the liquid in the glass (2) and is connected to a rod (5) guided in a discharge channel (6) of the receptacle (3) for reception of the liquids in the direction of the glass (2), said float (4) being provided with a specific surface treatment which confers on it a superficial microporosity and a roughness, by rolling in a mixture of silica and ammoniacal detergent, said discharge channel (6) being arranged in the body (1) and opening into said receptacle (3), said rod (5) being provided at its end opposite the float (4) with a stop forming simultaneously a manipulable handle (7), said body (1) further comprising a junction portion (16) interconnecting said rod (5) and said float (4), said junction portion (16) having flow-directing surfaces (17, 18) transmitting laminar flow of said liquids from said rod (5) to said float (4).

6. Device according to claim 5, wherein the discharge channel (6) has a ratio of diameter of passage to the diameter of the rod (5) equal to 1.7, with respective diameters of about 3.4 mm and about 2 mm and the float (4) has a diameter of about 42 mm.

7. In a device for the presentation in superposed layers of liquids of different density, particularly liquid foodstuffs, having a body (1) adapted to be mounted on a glass (2) to be filled, and having a receptacle (3) for reception of the liquids, on the side opposite that bearing on the glass (2), the improvement wherein the body is provided with a spherical float (4) that contacts the liquid in the glass (2) and is connected to a rod (5) guided in a discharge channel (6) of the receptacle (3) for reception of the liquids in the direction of the glass (2), said receptacle (3) being divided into several compartments (19) by means of vertical walls (20) extending radially about the discharge channel (6) of the rod (5) of the float (4), said compartments (19) being connected by means of conical spring valves (21) to a discharge chamber (3) communicating with the discharge channel (6), and each conical spring valve (21) being manipulable by means of a button (22), said discharge channel (6) being arranged in the body (1) and opening into said receptacle 3, said rod (5) being provided at its end opposite the float (4) with a stop forming simultaneously a manipulable handle (7), said body (1) further comprising a junction portion (16) interconnecting said rod (5) and said float (4), said junction portion (16) having flow-directing surfaces (17, 18) transmitting laminar flow of said liquids from said rod (5) to said float (4).

8. Device according to claim 7, wherein the buttons (22) are numbered so as to permit the user to index the compartments as a function of the densities of the liquids.

* * * * *